United States Patent
Bossard et al.

(10) Patent No.: US 12,067,769 B2
(45) Date of Patent: Aug. 20, 2024

(54) OBJECT RECOGNITION

(71) Applicant: Apple Inc., Cupertino, CA (US)

(72) Inventors: Lukas A. Bossard, Mountain View, CA (US); Matthias Dantone, Cupertino, CA (US); Samuel F. Dodge, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 17/581,840

(22) Filed: Jan. 21, 2022

(65) Prior Publication Data
US 2022/0392209 A1     Dec. 8, 2022

Related U.S. Application Data

(60) Provisional application No. 63/197,225, filed on Jun. 4, 2021.

(51) Int. Cl.
*G06V 10/00*     (2022.01)
*G06V 10/764*    (2022.01)
*G06V 10/98*     (2022.01)

(52) U.S. Cl.
CPC .......... *G06V 10/987* (2022.01); *G06V 10/764* (2022.01)

(58) Field of Classification Search
CPC .... G06V 10/987; G06V 10/774; G06V 10/24; G06V 2201/09; G06V 10/764; G06T 7/0002; G06T 2207/30232; G06T 2207/30168; G06T 2207/20084; G06T 2207/20081; H04N 5/23222; G06N 3/04; G06K 9/00805; G06K 9/2036; G06K 9/481; G06K 9/42; G06K 9/4628
See application file for complete search history.

(56) References Cited

U.S. PATENT DOCUMENTS

| | | | |
|---|---|---|---|
| 6,792,147 B1 | 9/2004 | Saka et al. | |
| 9,536,178 B2 * | 1/2017 | Mohamed | G06V 10/87 |
| 10,242,282 B2 * | 3/2019 | Loce | G06N 3/04 |
| 10,268,947 B2 * | 4/2019 | Wang | G06V 10/454 |
| 10,467,458 B2 * | 11/2019 | Wang | G06F 18/2413 |
| 10,755,099 B2 * | 8/2020 | Lin | G06V 20/64 |
| 11,004,209 B2 * | 5/2021 | Chen | G06V 10/82 |
| 11,238,314 B2 * | 2/2022 | Chadha | G06N 3/04 |

(Continued)

OTHER PUBLICATIONS

Hardwick, "iOS 15: How to Use Visual Lookup in Photos Identify Landmarks, Plants, and Pets," retrieved from https://www.macrumors.com/how-to/use-visual-lookup-photos-ios/, Jul. 8, 2021.

*Primary Examiner* — Amir Alavi
(74) *Attorney, Agent, or Firm* — BAKERHOSTETLER (57) ABSTRACT

The subject technology provides object recognition systems and methods that can be used to identify objects of interest in an image. An image such as live preview may be generated by a display component of the electronic device and an object of interest may be detected in the image. The detected object of interest may be classified using a classification model. Subsequent to classification, a confidence level in identifying the object of interest may be determined. In response to determining that the confidence level does not meet a confidence level threshold for identifying the object of interest, a request for a user input is generated. Based on the user input, the object of interest is identified using an object recognition model.

20 Claims, 6 Drawing Sheets

(56) References Cited

U.S. PATENT DOCUMENTS

| | | | |
|---|---|---|---|
| 11,367,272 B2 * | 6/2022 | Yang | G06F 18/00 |
| 11,423,634 B2 * | 8/2022 | Zhang | G06V 10/776 |
| 11,776,275 B2 * | 10/2023 | Bates | G06T 19/006 |
| | | | 382/103 |
| 2015/0146927 A1 | 5/2015 | Cebron et al. | |
| 2022/0114717 A1 * | 4/2022 | Drolia | G06N 3/045 |
| 2022/0179665 A1 * | 6/2022 | Rathod | G06F 9/451 |

* cited by examiner

OBJECT RECOGNITION

CROSS REFERENCE TO RELATED APPLICATIONS

This application claims the benefit of priority to U.S. Provisional Patent Application No. 63/197,225, entitled "Object Recognition," filed on Jun. 4, 2021, the disclosure of which is hereby incorporated herein in its entirety.

TECHNICAL FIELD

The present description generally relates to machine learning, including, for example, using machine learning for recognizing objects in an image.

BACKGROUND

Software engineers and scientists have been using machine learning to make improvements across different industry applications.

BRIEF DESCRIPTION OF DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices, such as mobile phones, can be used to perform image-based searches. An image-based search may be a search that takes an image as input and searches for information related to one or more objects in the image. However, some techniques of image-based searching may not provide accurate information regarding one or more objects in an input image in certain scenarios. For example, some image-based searches may provide inaccurate information when: the input image is hazy or blurry, the input image includes only a portion of an object to be recognized, the input image includes an object that is too far away to be properly recognized, the input image is obtained at an angle that does not capture sufficient detail for object recognition, and/or the input image includes image noise or other image content extraneous to one or more objects in the input image.

The subject technology for object recognition allows an electronic device to accurately detect and identify one or more objects of interest in an input image. The input image may be a stored image and/or may be an image that is concurrently being captured by an image sensor of the electronic device. In one or more implementations of the subject system, when an electronic device obtains an input image containing an object of interest and/or detects an object of interest or potential interest in an input image, the electronic device may classify or otherwise recognize the detected object of interest using one or more machine-learning models, and may determine a confidence level corresponding to the classification or recognition of the object. The classification or recognition of the object of interest may be used to identify the object of interest (and/or may indicate an identification of the object of interest) while the confidence level may indicate a level of accuracy in the identification of the object of interest (e.g., a level of accuracy in the identification of a particular object or a level of accuracy in distinguishing between two similar objects or two types or categories of an object).

When the confidence level for a given object identification is lower than a (e.g., predetermined) confidence level threshold or too similar to the confidence level for a different object identification, the electronic device may generate a request for user input to obtain additional information for identifying the object of interest. A request for user input may include, for example, prompting the user to take one or more additional images of the object of interest (e.g., from different positions/angles), capture a video of the object of interest, and/or record an audio input corresponding to the object of interest. The electronic device may guide the user, such as by providing visual and/or audio cues, to assist the user in providing the user input. The electronic device may then use the user input to refine the identification of the object of interest in the input image, such as by providing the user input along with the input image to another machine learning model for classification/identification (e.g., for a more accurate classification/identification or a classification/identification with finer granularity).

In the following description of the exemplary implementations of the subject technology, reference is made to the accompanying drawings, which form a part hereof, and in which is shown by way of illustration specific implementations in which the subject technology may be practiced. It is understood that other implementations may be utilized, and structural changes may be made without departing from the scope of the present invention.

Figure 1:
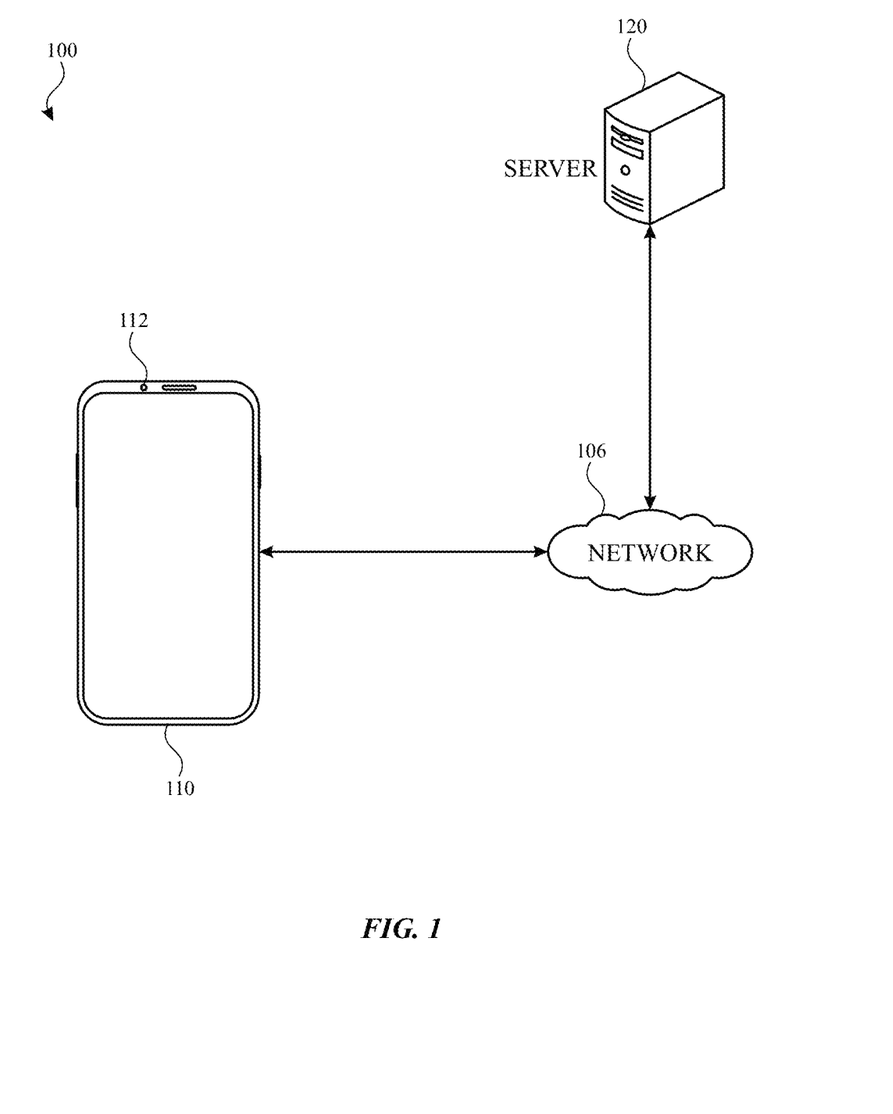
FIG. 1 illustrates an example network environment in accordance with one or more implementations of the subject technology.

FIG. 1 illustrates an example network environment 100 in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a network 106, an electronic device 110, and a server 120. In one or more implementations, the electronic device 110 may include a camera 112, such as an image sensor. The network 106 may communicatively (directly or indirectly) couple the electronic device 110 and the server 120. In one or more implementations, the network 106 may be an interconnected network of devices that may include, and/or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, a desktop computer, a portable electronic device such as a laptop computer, a smartphone, a peripheral device (e.g., a digital camera), a tablet device, a wearable device such as a watch, and the like. In FIG. 1, by way of example, the electronic device 110 is depicted as a smartphone. The electronic device 110 may be, and/or may include all or part of, the electronic system discussed below with respect to FIG. 8.

In one or more implementations, the electronic device 110 may provide a system for training one or more machine learning models using training data, where the trained machine learning models are subsequently deployed locally at the electronic device 110. Further, the electronic device 110 may provide one or more machine learning frameworks for training the machine learning models. In an example, such machine learning frameworks can provide various machine learning algorithms and models for different problem domains in machine learning. In an example, the electronic device 110 may be a user electronic device that is configured to identify objects in input images. In one or more implementations, the electronic device 110 may communicate with the server 120 for processing an input image using one or more machine learning models to detect and recognize one or more objects of interest in the image.

In an implementation, the server 120 may train one or more machine learning models for deployment to a client electronic device (e.g., the electronic device 110). In one or more implementations, the server 120 may provide a system for training a machine learning model using training data, where the trained machine learning model is subsequently deployed locally at the server 120. The machine learning model may be deployed on the server 120 and/or the electronic device 110, and may implement one or more machine learning algorithms. In an implementation, the server 120 may provide a cloud service that utilizes the trained machine learning model.

In one or more implementations, the electronic device 110 may be configured to obtain an image. The image may be obtained, for example, by capturing the image via the camera 112 of the electronic device, by generating a live preview image using a display screen or other display component of an electronic device, and/or by retrieving the image from memory. From the image, the electronic device 110 detects an object of interest and classifies or recognizes the object of interest using one or more machine-learning models. In conjunction with classifying or recognizing the object of interest, the electronic device 110 may determine a confidence level corresponding to the detected object. The confidence level may be understood as a level indicative of accuracy in identification or recognition of the object of interest. In one or more implementations, the confidence level may be determined and represented in the form of a confidence score.

The electronic device 110 may compare the determined confidence level to a (e.g., predetermined) confidence level threshold (or confidence score threshold) to determine whether the confidence level meets a (e.g., predetermined) threshold level for accurately identifying the object of interest. When the determined confidence level is lower than the confidence level threshold, the electronic device 110 may be configured to generate a request for user input based on the original input image, such as based on an output of the machine learning model. In one example, the request for user input may include providing a request to the user to take one or more additional images of the object of interest from a different position (e.g., a different angle and/or proximity) and/or using a different camera setting (e.g., zoom in, turning flash off, etc.). In another example, the request for user input may include prompting the user to record a video and/or audio input. In a further example, the request for the user input may include a request for one or more images of a specific portion of the object, and/or one or more other objects in the image.

In one or more implementations, the machine learning model may be trained to provide an output of an indication of an appropriate user input for increasing the confidence score. For example, if the machine learning model classifies the image as blurry, the machine learning model (and/or associated logic) may provide an output that requests additional user input of taking an additional image while holding the electronic device steady. In one or more implementations, if the machine learning model classifies the image as having a suboptimal angle, the machine learning model may provide an output that requests that the user capture another image at a more optimal angle (e.g., by providing an indication of the angle that can be presented to the user and/or providing guidance to the user as to how to rotate and/or shift the electronic device to capture an image from the angle). In general, the machine learning model may be trained to identify and/or generate a specific type of request for user input based on the content, quality, and/or type of quality deficiency (e.g., blurriness, detail, angle, etc.) of the image that is input to the model.

In one or more implementations, the user input may be obtained automatically by the electronic device via, for example, by automatically activating and/or utilizing one or more sensors in the electronic device. For example, the electronic device may obtain user's location as the user input via a global positioning sensor (GPS) sensor in the electronic device, and/or the electronic device may automatically adjust one or more camera settings and/or parameters and automatically capture another image (such as from the live preview).

After receiving the user input, the electronic device 110 may identify the object of interest based on the received user input and the original input image. In one or more implementations, the electronic device 110 may provide the user input (e.g., and the image and/or an output of the prior classification of the image) to an additional machine-learning model (e.g., and object recognition model), and the additional machine learning model may provide a classification/identification of the object of interest. As an example, the additional machine learning model may have been trained to classify objects in images at a high confidence level (e.g., higher than the initial machine learning model used for object classification) based on an image and a particular user input, such as an additional image, a video capture, and audio capture, etc. As another example, the additional machine learning model may have been trained to classify, recognize, and/or identify objects in images with a finer granularity than the initial machine learning model (e.g., to identify a tomato plant in an image for which the initial machine learning model only identified a plant, to identify a rose in an image for which the initial machine learning model only identified a flower, to identify a Beach rose in an image for which the initial machine learning model only identified a rose, to identify a particular brand of car in an image for which the initial machine learning model only identified a car, or to identify a particular type of ball in an image for which the initial machine learning model only identified a ball). Thus, the aspects of the present subject matter provide accurate identification of objects of the interest.

Figure 2:
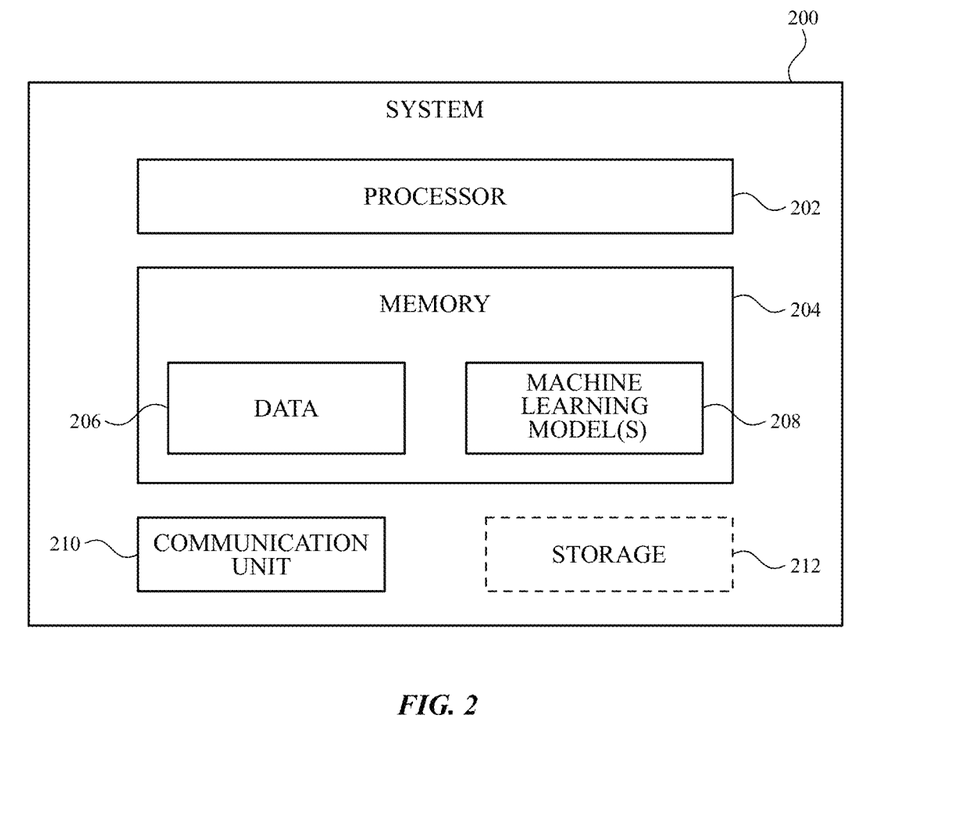
FIG. 2 illustrates an example system for object recognition in accordance with one or more implementations of the subject technology.

FIG. 2 illustrates an example system 200 for object recognition in accordance with one or more implementations of the present subject technology. In an example, the system 200 may be implemented in a computing device, such as the electronic device 110 and/or the server 120. In another example, the system 200 may be implemented either in a single device or in a distributed manner in several devices.

In an example, the system 200 may include a processor 202, memory 204 (memory device) and a communication unit 210. The memory 204 may include one or more data structures 206 and one or more machine-learning models 208. In an example, the system 200 may include and/or may be communicatively coupled with a storage 212. Thus, the storage 212 may be either an internal storage or an external storage.

In an example, the processor 202 may be a single processing unit or a number of units, all of which could include multiple computing units. The processor 202 may be implemented as one or more microprocessors, microcomputers, microcontrollers, digital signal processors, graphics processing units, neural processors (or other specialized processors), central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The one or more data structures 206 serve, amongst other things, as a repository for storing data processed, received, and generated by one or more of the processors 202. One or more of the aforementioned components of the system 200 may send or receive data, for example, using one or more input/output ports and one or more communication units.

The machine-learning model(s) 208, in an example, may include and/or implement a neural network architecture, or any other machine-learning architecture. In an example, the machine-learning model(s) 208 may be implemented by the processor 202 for performing the operations and steps, as described herein.

In an example, the communication unit 210 may include one or more hardware units that support wired or wireless communication between the processor 202 and processors of other electronic devices. Furthermore, the electronic device 110 may include and/or may be coupled to an image capturing device, for example, a camera, and an audio device, for example, a speaker.

In one or more implementations, the processor 202 may identify objects in an image obtained by the electronic device 110. In one example, the processor 202 may obtain the image from the memory 204 (and/or a remote storage), and/or from the camera 112 of the electronic device 110, such as by capturing the image and/or in conjunction with a live preview image being displayed by a display screen or other display component of the electronic device 110. The processor 202 may provide the captured image to one of the machine learning model(s) 208 to detect and/or identify one or more objects of the interest in the image. Examples of the objects of interest may include, for example, people, cars, motorbikes, flowers, plants, vegetables, fruits, food dishes, animals, birds, trees, and monuments and/or any other object that may appear in an image.

In one or more implementations, the processor 202 may use predefined object detection techniques for identifying one or more objects in the image, and may determine one or more of the objects that may be of interest (e.g. for classification). For example, the processor 202 may identify an object of interest as a detected object that occupies the largest area in the image or a detected object that is centrally positioned in the image. In another example, the processor 202 may display a visual indicator (and/or other visual cue) proximate to and/or overlapping one or more of the detected objects in a display of the image (such as a live preview), and may prompt the user to select an object of interest from the detected objects.

In one or more implementations, once the object of interest is detected and/or as part of a joint detection and classification operation, the processor 202 may classify the object of interest using a machine-learning model 208 (e.g., a classification model) trained to classify the object of interest using a predefined classification technique such as object classifier. In an example, the classification may include classifying the object into one of various categories and/or sub-categories. For example, when the object of interest is a cherry, the classification may identify the object of interest as a fruit and may further identify the object of interest to be a cherry. As another example, when the object of interest is a tomato plant, the classification may identify the object of interest as a plant and may further identify the object of interest to be a tomato plant. As another example, when the object of interest is a silver birch tree, the classification may identify the object of interest as a tree and may further identify the object of interest to be a silver birch tree.

In one or more implementations, the machine learning models 208 may include different machine learning models for detecting different types of objects. For example, one machine learning model may be trained to classify or otherwise recognize fruits in images, another machine learning model may be trained to classify or otherwise recognize flowers in images, and so forth. In one or more implementations, the machine learning models 208 may include a universal machine learning model that is trained to classify or otherwise recognize any type of object detected in an image.

The processor 202 may determine and/or obtain a confidence level corresponding to the classification of the object of interest by the machine learning model. In one or more implementations, the confidence level may be generated as a part of the classification process. For example, the machine learning model 208 may output the classification of the object as well as a confidence level corresponding to the classification. The confidence level may be, for example, a numeric score on a given scale.

In one or more implementations, once the processor 202 determines and/or obtains the confidence level, the processor 202 may determine whether the confidence level is less than (and/or satisfies) a (e.g., predetermined) confidence level threshold or whether the confidence level for one classification is higher than the confidence level(s) for one or more other classifications by a threshold amount. In one or more implementations, the confidence level threshold may be determined in advanced to be different for different types of objects, such as based on the diversity and/or complexity of the object being classified, and/or the confidence level threshold may be determined in advanced to be the same across all different types of objects. In one or more implementations, the confidence level threshold may be set to a predetermined value between 0 and 1, with 1 being the highest confidence level and 0 the lowest. Thus, in one or more implementations, when a high level of confidence is desired the confidence level threshold may be set to, for example, a value between 0.9 and 1.

When the processor 202 determines that the confidence level is lower than the confidence level threshold or that the difference between the confidence level for one classification and the confidence level for another classification is below a difference threshold, the processor 202 may be configured to generate a request (such as a prompt) for user input. As explained above, the user input may be one or more additional images of the object of interest taken from positions other than a position of the obtained image. In another example, the requested input may be, for example, a video capture and/or an audio capture. In one or more implementations, the processor may display a list of possible classifications identified by the machine learning model and request the user to select which of the classifications is correct.

In an example, the generated request may be displayed to the user (e.g., by a display component of the electronic device 110). For instance, consider a case where additional images of the object of interest are required. In such a case, guidance, such as, for example, "Please capture X additional images of the object of interest" may be displayed on the display of the electronic device 110. In one or more implementations, the electronic device 110 may provide guidance to the user with respect to an orientation, direction, distance and/or any other parameter with respect to the object of interest. For example, if the object of interest has one or more visual features that would distinguish the object from other similar objects, and those features were not present, were partially present, and/or were blurry in the original image, the electronic device 110 may prompt the user to capture an image that includes the distinguishing visual features. In one or more implementations, the machine learning model may be trained to identify one or more partial and/or missing distinguishing visual features of the object of interest and/or one or more heuristics may be used to identify missing and/or partial distinguish features.

In one or more implementations, the electronic device 110 may suggest different camera settings and/or parameters to the user (e.g., zoom level, flash on/off, etc.), and/or the electronic device 110 may automatically adjust the camera settings and/or parameters. In another example, the processor 202 may display a request to capture a video of the object of interest.

On viewing the request for user input, the user may subsequently perform one or more interactions with the electronic device to provide the user input. For instance, the user may capture additional images or may record the video using the electronic device 110. The processor 202 may be configured to receive a response to the request, where the response includes the user input.

When the response including the requested user input is received, the processor 202 may be configured to identify the object of interest based on the response using another machine-learning model 208 (e.g., an object recognition model). In an example, the processor 202 may provide the image and the user input as an input to the object recognition model. The object recognition model may identify the object of interest and may output data indicating and/or identifying the object of interest.

In one or more implementations, the electronic device 102 may store different machine learning models that have each been trained using different types of user input. For example, a first machine learning model may have been trained based on an input image of an object and an additional image with a different perspective of the object, a second machine learning model may have been trained based on an input image of an object and a video capture of the object, and so forth. The electronic device 102 may include any number of machine learning models that have been trained based on an input image of an object and any form of user input that may facilitate classifying or otherwise recognizing the object. Thus, by implementing the above aspects, the subject system can increase the accuracy of identification of objects of interest.

In one or more implementations, the processor 202 may be configured to re-assess the confidence level after receiving the user input, such as based on the confidence level output by the additional machine learning model. In case the confidence level is still below the confidence level threshold or still too similar to the confidence level associated with a different classification, the processor 202 may either again ask for user input or may provide an identification of the detected object, such as with an indication that the object was identified with a low level of confidence.

In one or more implementations, in the example where the user is capturing the image in real-time, such as using the camera 112 of the electronic device 110, the processor 202 may be display a visual indicator overlapping (and/or proximate to) the detected object in a live preview being displayed on the electronic device 110. In one or more implementations, the visual indicator may be selectable and the electronic device 110 may display an indication of the identification of the object of interest responsive to the user selecting the visual indicator.

In one or more implementations, the machine learning model used for object identification may be configured to identify the object of interest based on contextual information associated with one of the images and the one or more other objects in the image. For instance, consider a case where the image is of a dish which typically includes cherry tomatoes. In the identification, the machine learning model may identify the dish and may accordingly identify with greater accuracy that the tomato is a cherry tomato. Likewise, in examples in which additional inputs include additional images of other objects, the machine learning model may identify contextual information associated with the other objects and may accordingly identify the object of interest. The contextual information may be understood as related information that may assist in identifying the object. The contextual information may be in an audio, video and/or textual format. Examples of contextual information include: a geographical location and/or a season that helps in identifying a specific fruit, a sound recording of an animal that may help in identifying the animal, a logo on shoes may help in identifying the shoe, a leaf and/or a video recording that may help in identifying a flower, an image of a specific kind of tail that may help in identifying an animal breed, and the like.

In one or more implementations, the object recognition model may be configured to identify the object of interest further based on sensor data collected from one or more sensors of the electronic device 110 and/or a proximate electronic device (e.g., a watch, a wearable audio output device, and the like). For instance, location data collected by a location sensor may be used in the identification of the object of interest (e.g., through heuristics and/or model training). As an example, consider that an image of a cherry tomato is taken at a geographic location which is known for producing cherry tomatoes. Thus, in such a case, the machine learning model (and/or heuristics applied in pre- and/or post-processing) may be configured to identify the object of interest with increased accuracy based on the location information associated with the image.

Figure 3:
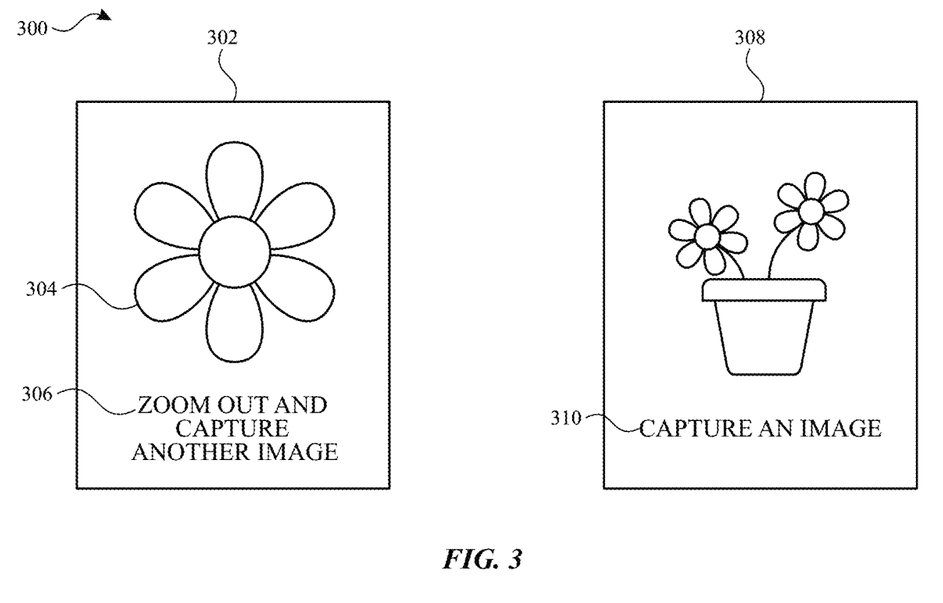
FIGS. 3-6 illustrate example use cases for object recognition in accordance with one or more implementations of the subject technology.

FIG. 3 illustrates a use case 300, in accordance with one or more implementations of the subject technology. The user case 300 includes preview image 302 and preview image 308. In the preview image 302, an image of an object 304 is displayed (e.g., with a display component of the electronic device 110), where the preview image 302 includes a zoomed in view of the object 304 as captured by the camera 112 of the electronic device 110. The electronic device 110 may provide the image to a machine learning model for classification or recognition, and the machine learning model may output a classification or other recognition with a confidence level that is below a confidence level threshold. According to aspects of the present subject matter, the electronic device 110 may display guidance 306 to the user requesting that the user zoom the camera 112 out and capture another image of an object of interest. The user may zoom out thereby resulting in the image preview displayed in preview 308. In preview 308, additional guidance 310 to capture an image may be provided to the user.

Figure 4:
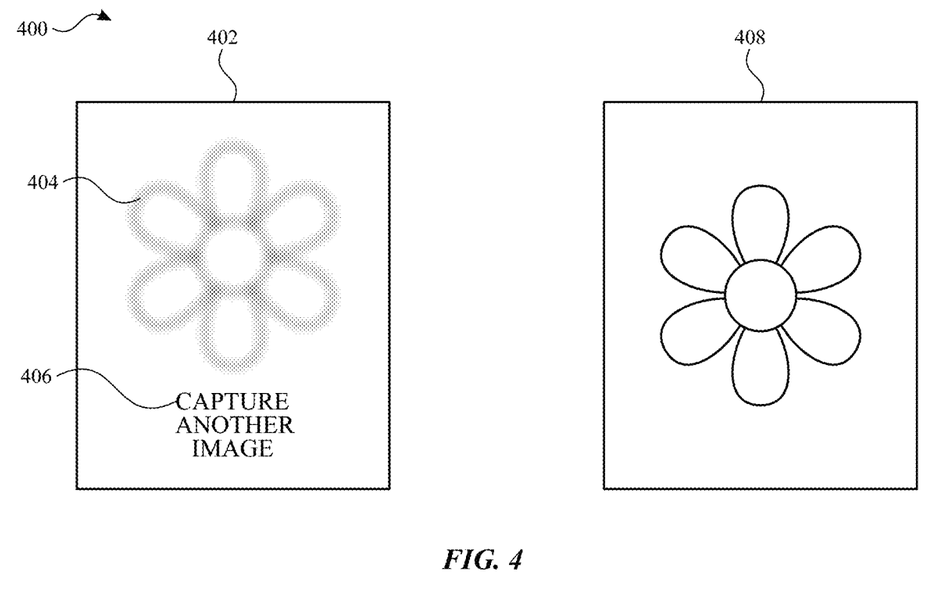

FIG. 4 illustrates a use case 400, in accordance with one or more implementations of the subject technology. In the use case 400, an image 402 of an object 404 is shown, where the image 402 is blurry. According to aspects of the present subject matter, guidance 406 may be presented to a user to capture another image. In response to the guidance, the user may capture another image 408, which, in one or more implementations, may be clear as shown, and therefore the object therein may be classifiable or otherwise recognizable by the machine learning model. It is also appreciated that the example of a blurry image in FIG. 4 is merely illustrative, and the aspects of the subject technology described herein can be applied to improve classification, recognition, and/or identification of objects in images having other quality issues, such as motion blur, low light, overexposure, focus on a different object in the image, occlusion of an object, lens artifacts, or any other image artifact that may hinder the identification of an object in the image. For example, in one or more implementations, machine learning model(s) 208 may be trained to generated issue-specific guidance to address a particular image quality issue in an initial image. In some such use cases, an image quality issue can be addressed simply by capturing another image (e.g., the camera itself may adjust an exposure time or a focus setting in the new image) as in the example of FIG. 4. In other such use cases, the guidance 406 may indicate to the user how to capture another image to improve one or more specific image quality issues (e.g., to move the camera to center the object of interest in the frame to address a focus issue, to turn on a flash or a room light to address a low light issue, to remove an occluding object or change an angle of the camera to address an occlusion issue, or the like).

Figure 5:
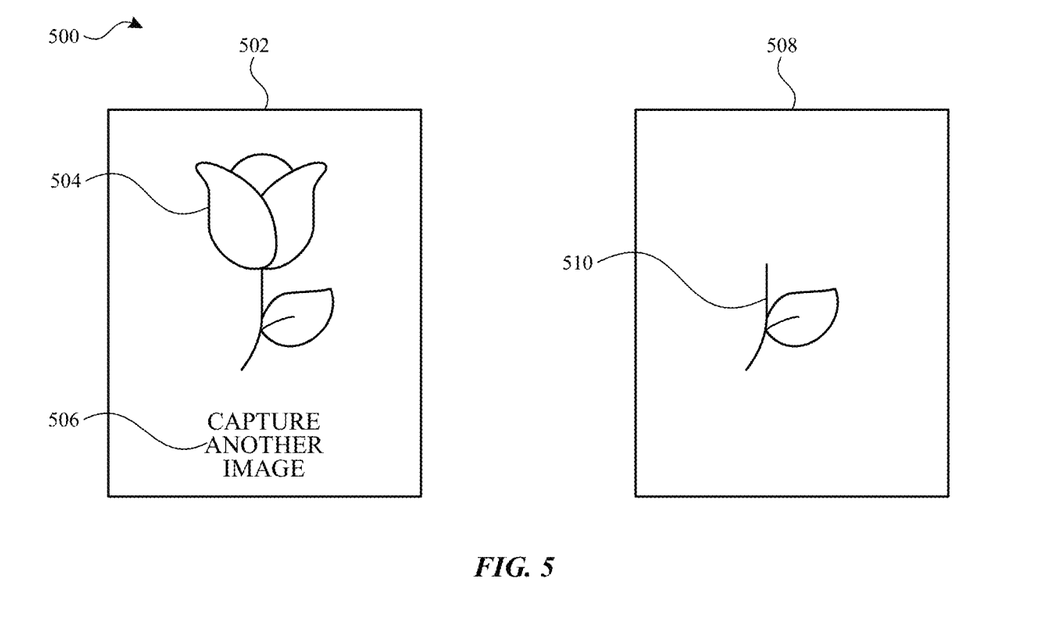

FIG. 5 illustrates a use case 500, in accordance with one or more implementations of the subject technology. In the use case 500, an image 502 of an object 504 (e.g., a flower) is shown. In said use case the confidence level of identifying the object 504 determined based on the image 502 may be below a confidence level threshold associated with the object 504 (e.g., because details of a leaf of the flower are not visible in the image 502). As one example, the confidence level of identifying the object 504 as a flower may be below the confidence level threshold for identifying an object as a flower. As another example, the confidence level may be sufficiently high to identify the object 504 as a flower, but insufficient for identifying the object as a particular type of flower (e.g., or sufficiently high for identifying the object 504 as a rose, but insufficient for distinguishing which type of rose). Guidance 506 to capture an additional image may be provided to the user. In one example, the electronic device 110 may include a machine learning model 208 that has been trained using training images of various types of a flower (e.g., various different types of rose). In this example, the machine learning model 208 may have learned that images showing a detailed view of a leaf of a rose can be used to distinguish between the various types of roses. In this example, the machine learning model 208 may determine, from the image 502, that the image is an image of a rose, and may cause the guidance 506 to include an instruction to capture another image with a view of a leaf of the flower.

In response to the guidance 506, the user may capture an image 508 of object 510. Based on the representation of the object 510 in the image 508 (e.g., a zoomed in image of the leaf in the example of FIG. 5), the confidence level associated with identifying the object 504 (e.g., as a particular type of rose) may be increased beyond the threshold and an accurate identification of the object 504 may be performed. In various use cases, increasing the confidence level associated with identifying the object 504 may include increasing the confidence level associated with identifying the object 504 as a first particular type of object and reducing the confidence level associated with identifying the object 504 as a second particular type of object, thus allowing identification of the object 504 as the first particular type of object (e.g., identifying the object 504 as a Damask rose and not an Eden rose).

It is appreciated that the flower example depicted in FIG. 5 is merely illustrative, and the electronic device 110 may generate user guidance for improving the classification and/or identification of various other objects and/or types of other objects. In one other illustrative example, an input image containing a partial view of a logo on a product may be provided to one or more machine learning models 208 at the electronic device 110. For example, the logo may be partially blocked by another object or the camera angle or position may have caused a portion of the logo to be cut off or obscured in the input image. In this example, the machine learning models 208 may have been trained to generate an output that causes the electronic device 110 to generate guidance 506 that instructs the user to obtain another image (e.g., an unobscured image or a zoomed-in image) of the logo. It is also appreciated that the example of a logo of a product is also illustrative, and the operations described in the above example can be applied to a logo or any other distinguishing feature of a product or any other object.

Figure 6:
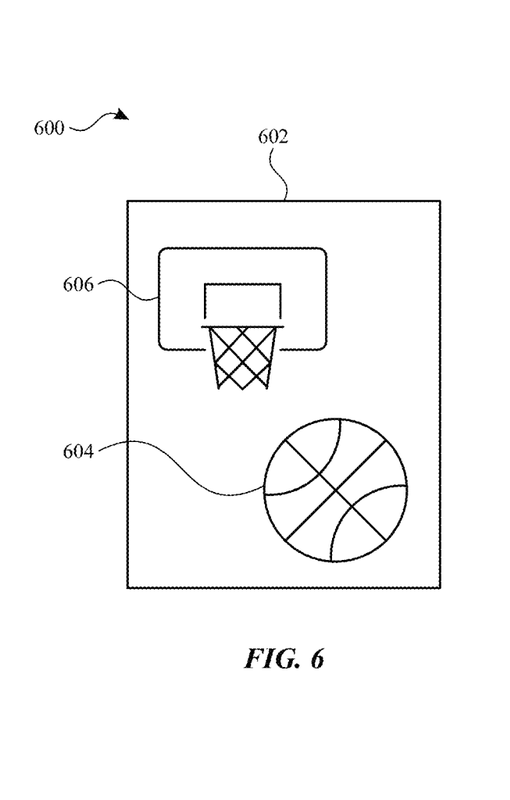

FIG. 6 illustrates a use case 600, in accordance with one or more implementations of the subject technology. In the use case 600, an image 602 of an object 604 (e.g., a basketball) is shown. According to aspects of the subject technology, contextual information associated with the image 602 may be determined. For instance, another object 604 (e.g., a basketball basket and backboard) may also be identified in the image 602 and it may be determined that the image relates to the game of basketball. During the identification, it may be determined with greater accuracy that the object 604 is a basketball, based on the determined contextual information.

Figure 7:
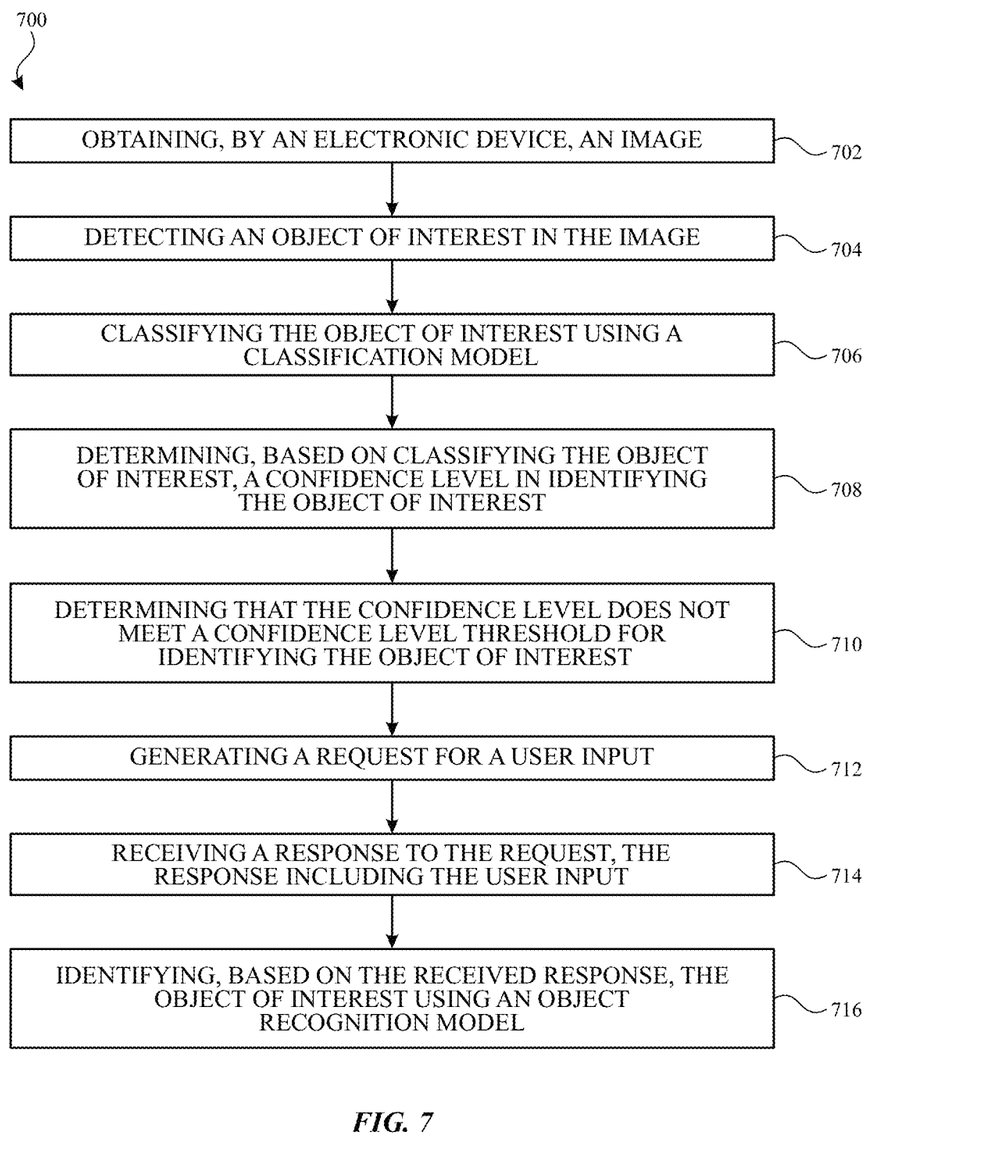
FIG. 7 illustrates a flowchart of an example process for recognizing an object of interest in an image, in accordance with one or more implementations of the subject technology.

FIG. 7 illustrates a flowchart of a process 700, in accordance with one or more implementations of the subject technology. In an example, the process 700 may be implemented by the system 200. In an example, the process 700 may be implemented in a single electronic device, for example, the electronic device 110 and/or the server 120. In another example, the method 700 may be implemented in a distributed manner, without departing from the spirit and scope of the present subject matter. Furthermore, details of the steps of the process 700 which are already described herein in the above figures are not included in detail below. Furthermore, the operations of the process 700 described herein may be implemented at least by one or more components, for example, the processor 202 of the system 200.

At block 702, an image is obtained by an electronic device, such as, for example, the electronic device 110. The image may be, for example, a live preview image captured and concurrently displayed by a display screen or other display component of an electronic device, or the image may be an image captured by and/or stored in the electronic device. For example, the image may be one or more of the images 302, 402, 502, 602 as shown in the FIGS. 3-6 respectively.

At block 704, an object of interest (object of interest) is detected in the obtained image by the electronic device 102. For example, electronic device 110 may detect one or more of the objects 304, 404, 504, 604 in the respective images 302, 402, 502, 602 shown in the FIGS. 3, 4, 5 and 6, respectively.

In the example of FIG. 7, at block 706, the object of interest is classified using a classification model. In one or more implementations, the electronic device (e.g., the electronic device 110) may provide all or part of the image that includes the detected object of interest as an input to a machine-learning model (e.g., a classification model) trained to classify the objects. As an output of the machine-learning model, the object of interest may be classified into a predefined classification to identify the object. For example, the respective object of interests 304, 504 shown in FIGS. 3 and 5 may be classified as a 'flower' as and the object of interest 604 shown in the FIG. 6 may be classified as a 'basketball'.

At block 708, a confidence level in identifying the object of interest is determined based on the classification of the object of interest. In one or more implementations, the electronic device 110 may determine the confidence level in identifying the object of interest based on an output provided by the machine learning model in conjunction with the classification of the object of interest. The confidence level may be understood as a level of accuracy in identification or recognition of the object of interest. In an example, the confidence level may be determined and/or represented in the form of a numeric score. In one or more implementations, more than one machine learning model, such as a plurality of machine learning models, may be used to determine the confidence level. Further, in addition to or separately from identifying the confidence level using the machine learning model, the electronic device 110 may determine the confidence level using one or more image processing algorithms or other models based on such algorithms.

In one or more implementations, a machine learning model and/or an image processing algorithm may be used to perform a first pass filter and/or classification of the image. For example, the machine learning model may classify whether the image is too blurry to properly detect any objects and, if so, may prompt the user to capture another image that is not blurry (e.g., by prompting the user to hold the electronic device steady and/or by activating a digital and/or analog shake reduction mechanism).

At block 710, it may be determined whether the confidence level meets a (e.g., predetermined) confidence level threshold for identifying the object of interest. On determining that the confidence level does not meet the confidence level threshold for identifying the object of interest, the method may proceed to block 712. In an example, on determining that the confidence level threshold is met, the results of the classification are deemed as an accurate identification of the object of interest. Consequently, results of the classification are provided as an output (such as displayed to a user of the electronic device 11), and the process 700 ends.

At block 712, in response to determining that the confidence level does not meet the confidence level threshold, a request for user input is provided. The user input may be and/or may include, for example, any supplementary audible, visual, and/or textual input that may assist in accurate identification of an object in the image. In an example, the request may be displayed to the user on or with a display component of the electronic device (e.g., the electronic device 110). As an instance, in the example shown in the FIG. 4, it is determined that the confidence level threshold is not met as the object 404 is blurry and thus the object 404 was not identified as a result of classification. Therefore, a request for user input, such as requesting a user to capture another image of the object 404 is generated and displayed to the user on the display of the electronic device. In another example, the request may be presented to the user using an audio device associated with the electronic device.

In one or more implementations, the request for the user input may be generated using a machine learning model and/or an image processing algorithm that may receive the output of the blocks 708 and/or 710 as an input and generates an output indicative of a user input needed to satisfy the confidence level threshold. Accordingly, a request for such user input may be generated based on the output of the machine learning model. For example, the machine learning model and/or image processing algorithm may determine that an input image was too blurry and therefore the confidence level threshold was not met. Thus, a user input, for example, of another image that is not blurry may be needed to satisfy the confidence level threshold. Accordingly, a request for another image with guidance, such as hold the camera steady and/or take a picture of a particular region and/or attribute of the object, may be provided to the user, and, e.g., the process may be repeated using the additional image (and, e.g., repeated again recursively using another additional image if the resulting confidence level does not satisfy the confidence level threshold).

In another example, the machine learning model and/or image processing algorithm may determine that the image was not taken at an angle or position to accurately capture and identify the object, and thus a user input, for example, an image of the object taken at angle 'X' may be needed to satisfy the confidence level threshold. Accordingly, a request for another image with guidance, such as rotate the camera at a certain position, may be provided to the user.

At block 714, a response including the user input is received. In an example, the user may provide the response by interacting with the electronic device. As an instance, referring to the example shown in the FIG. 4, another image 408 of the object 404 is received from the user. At block 716, the object of interest is identified based on the response using an object recognition model and/or another machine learning model and/or heuristic. In an example, the identifying includes identifying the object of interest based on the image and the user input. In one or more implementations, the process 700 or at least one or more of the blocks (e.g., blocks 704-714) of the process 700 may be repeated, e.g., recursively, until the confidence level is met and/or the object of interest has been identified based on the received response (e.g., user input).

Figure 8:
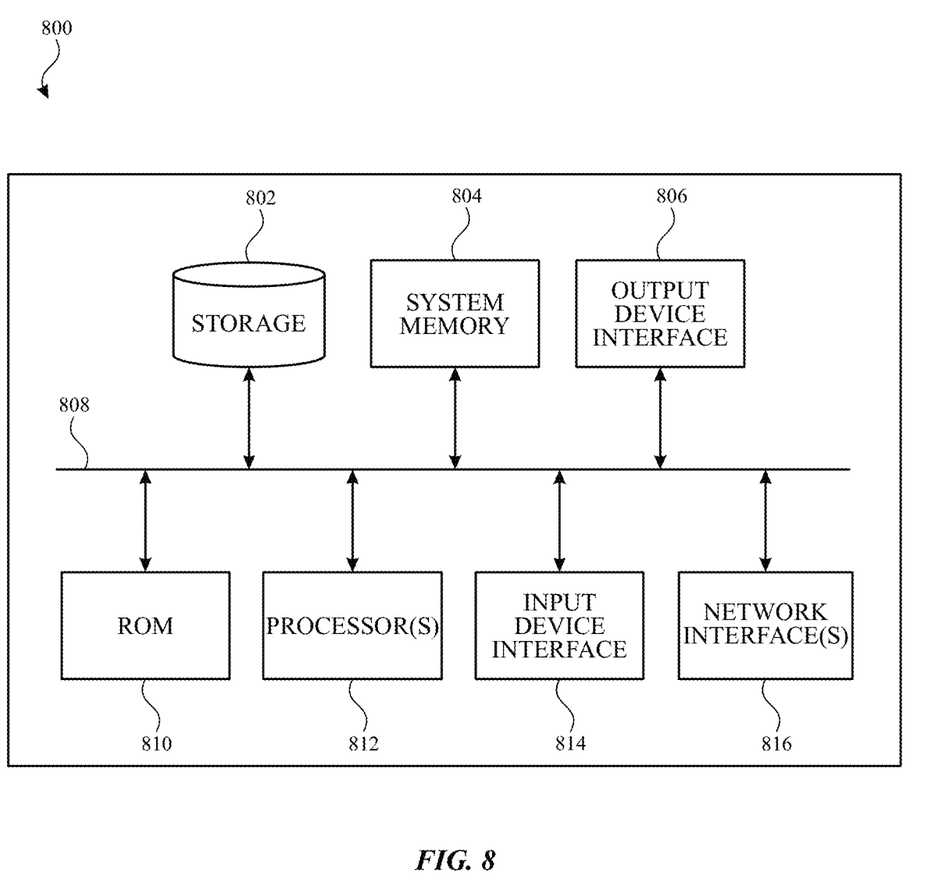
FIG. 8 illustrates an example computing-device based implementation of the system of FIG. 2, in accordance with one or more implementations of the subject technology.

In the example shown in the FIG. 4, the electronic device provides the image 402 and the other image 408 as an input to an object recognition model to identify the object of interest 404 as 'flower'. In an example, the object recognition model is a machine-learning model trained to identify the object of interest based on the user input and contextual information associated with at least one of: the image and the one or more other objects in the image. For example, the contextual information may be requested as user input and provided responsive to the request and/or may be sensor data collected from one or more sensors of the electronic device 110 and/or sensors accessible to the electronic device 110. For example, a positioning sensor may be used to determine a location where the image is being and/or was captured FIG. 8 illustrates an electronic system 800 with which one or more implementations of the subject technology may be implemented. The electronic system 800 can be, and/or can be a part of, the electronic device 110, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers, display devices (e.g., including display components such as a liquid crystal display (LCD), a light emitting diode (LED) display, an organic light emitting diode (OLED) display, a flexible display, a flat panel display, a solid state display, a smart glass display, an electric ink display, a projector, or any other component capable of outputting images), or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

The present disclosure recognizes that the use of personal information data, in the present technology, can be used to the benefit of users. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of object recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementation or embodiments, the present disclosure also contemplates that the various embodiments can also be implemented without the need for accessing such personal information data. That is, the various embodiments of the present technology are not rendered inoperable due to the lack of all or a portion of such personal information data.

In accordance with aspects of the disclosure, a method is provided that includes obtaining, by an electronic device, an image; detecting an object of interest in the image; and classifying the object of interest using a classification model. Further, the method includes determining, based on classifying the object of interest, a confidence level in identifying the object of interest; and responsive to determining that the confidence level does not meet a confidence level threshold for identifying the object of interest: generating a request for a user input; receiving a response to the request, the response including the user input; and identifying, based on the received response, the object of interest using an object recognition model.

In accordance with other aspects of the disclosure, a system is provided that includes a processor; and a memory device containing instructions, which when executed by the processor, cause the processor to: obtain an image; detect an object of interest in the image; classify the object of interest using a classification model; determine, based on classifying the object of interest, a confidence level in identifying the object of interest; and responsive to determining that the confidence level does not meet a confidence level threshold for identifying the object of interest: generate a request for a user input; receive a response to the request, the response including the user input; and identify, based on the received response, the object of interest using an object recognition model.

In accordance with other aspects of the disclosure, a non-transitory machine-readable medium is provided that includes code that, when executed by a processor, causes the processor to perform a method, the method including obtaining, by an electronic device, an image; detecting an object of interest in the image; and classifying the object of interest using a classification model. Further, the method includes determining, based on classifying the object of interest, a confidence level in identifying the object of interest; and responsive to determining that the confidence level does not meet a confidence level threshold for identifying the object of interest: generating a request for a user input; receiving a response to the request, the response including the user input; and identifying, based on the received response, the object of interest using an object recognition model.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   obtaining, by an electronic device, an image;
   detecting an object of interest in the image;
   classifying the object of interest using a classification model;
   determining, based on classifying the object of interest, a confidence level in identifying the object of interest; and
   responsive to determining that the confidence level does not meet a confidence level threshold for identifying the object of interest:
     generating a request for a user input;
     receiving a response to the request, the response including the user input; and
     identifying, based on the received response, the object of interest using an object recognition model.

2. The method of claim 1, wherein the user input comprises at least one of: one or more additional images captured from one or more orientations different than an orientation of the image, a visual input, an audio input, or one or more images of one or more other objects in the image.

3. The method of claim 1, further comprising displaying, with a display component of the electronic device, a live preview of the image.

4. The method of claim 1, further comprising:
   displaying the request for the user input with a display component of the electronic device; and
   providing, with the display component, guidance to a user with respect to providing the user input.

5. The method of claim 4, wherein providing, on the display, the guidance further comprises presenting the guidance via an audio device of the electronic device.

6. The method of claim 1, wherein the object recognition model is configured to identify the object of interest based on the user input and contextual information associated with at least one of: the image and one or more other objects in the image.

7. The method of claim 6, wherein the object recognition model is configured to identify the object of interest further based on sensor data collected from one or more sensors of the electronic device.

8. A system, comprising:
   a processor; and
   a memory device containing instructions, which when executed by the processor, cause the processor to:
   obtain an image;
   detect an object of interest in the image;
   classify the object of interest using a classification model;
   determine, based on classifying the object of interest, a confidence level in identifying the object of interest; and
   responsive to determining that the confidence level does not meet a confidence level threshold for identifying the object of interest:
     generate a request for a user input;
     receive a response to the request, the response including the user input; and
     identify, based on the received response, the object of interest using an object recognition model.

9. The system of claim 8, wherein the user input comprises at least one of:
   one or more additional images captured from one or more orientations different than an orientation of the image, a visual input, an audio input, or one or more images of one or more other objects in the image.

10. The system of claim 8, wherein the processor is further configured to display, with a display component of the system, a live preview of the image.

11. The system of claim 8, wherein the request for the user input is displayed by a display component of the system, and the processor is further configured to:
    provide, on the display, guidance to a user with respect to providing the user input.

12. The system of claim 11, wherein the processor is further configured to present the guidance via an audio device of the system.

13. The system of claim 8, wherein to identify the object of interest, the processor is further configured to obtain and provide the user input and contextual information associated with at least one of the image and one or more other objects in the image to the object recognition model, wherein the object recognition model is trained to identify the object of interest based on the user input and the contextual information.

14. The system of claim 13, wherein to identify the object of interest, the processor is further configured to obtain and provide sensor data collected from one or more sensors in the system to the object recognition model, wherein the object recognition model is trained to identify the object of interest further based on the sensor data.

15. A non-transitory machine-readable medium comprising instructions that, when executed by a processor, causes the processor to perform operations comprising:
    obtaining, by an electronic device, an image;
    detecting an object of interest in the image;
    classifying the object of interest using a classification model;
    determining, based on classifying the object of interest, a confidence level in identifying the object of interest; and
    responsive to determining that the confidence level does not meet a confidence level threshold for identifying the object of interest:
      generating a request for a user input;
      receiving a response to the request, the response including the user input; and
      identifying, based on the received response, the object of interest using an object recognition model.

16. The non-transitory machine-readable medium of claim 15, wherein the user input comprises at least one of: one or more additional images captured from one or more orientations different than an orientation of the image, a visual input, an audio input, or one or more images of one or more other objects in the image.

17. The non-transitory machine-readable medium of claim 15, wherein the operations further comprise displaying, with a display component of the electronic device, a live preview of the image.

18. The non-transitory machine-readable medium of claim 15, wherein the operations further comprise:
    displaying the request for the user input with a display component of the electronic device; and
    providing, on the display, guidance to a user with respect to providing the user input.

19. The non-transitory machine-readable medium of claim 18, wherein providing, on the display, the guidance comprises presenting the guidance via an audio device of the electronic device.

20. The non-transitory machine-readable medium of claim 15, wherein the object recognition model is configured to identify the object of interest based on the user input and contextual information associated with at least one of: the image and one or more other objects in the image.

* * * * *